July 13, 1926.
S. DEBUS
SPRAY NOZZLE
Filed Sept. 8, 1925
1,592,448
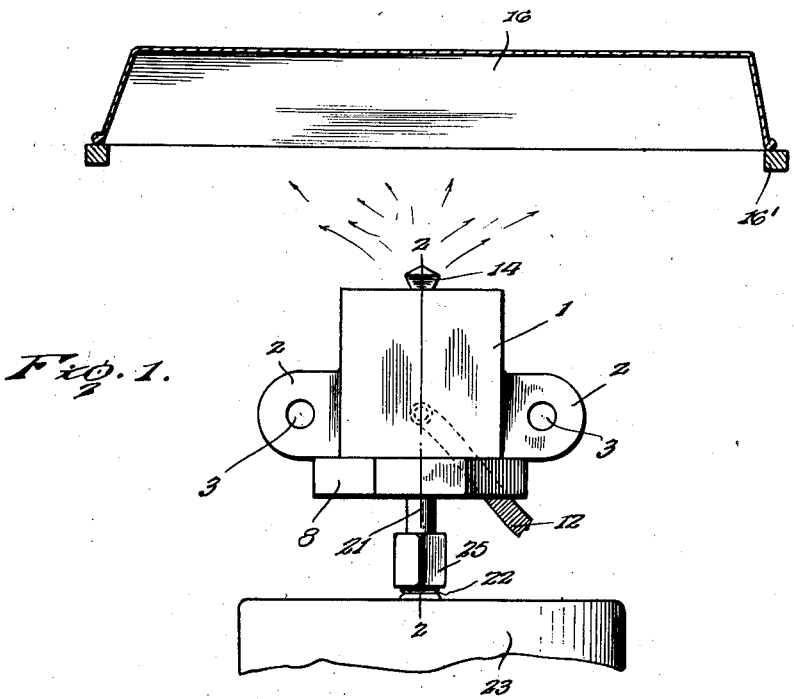
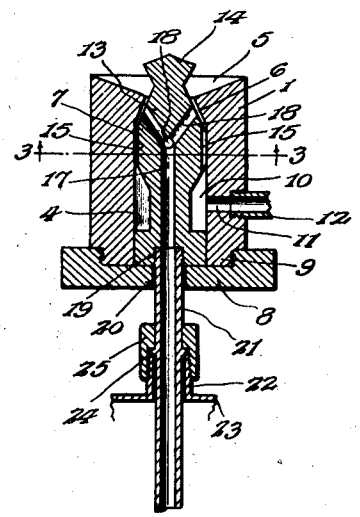
Inventor
S. Debus.
By Lacy & Lacy, Attorney Patented July 13, 1926.

1,592,448

UNITED STATES PATENT OFFICE.

SANDER DEBUS, OF HASTINGS, NEBRASKA, ASSIGNOR OF ONE-HALF TO WILLIAM E. PATZER, OF HASTINGS, NEBRASKA.

SPRAY NOZZLE.

Application filed September 8, 1925. Serial No. 55,108.

This invention relates to a spray nozzle adapted for use in connection with an apparatus for applying hot grease to pans, such as are used when baking bread, and one object of the invention is to so construct the nozzle that the hot grease may be discharged therefrom in a spray which will be directed against the interior of the baking pan and evenly coat the pan with a thin layer of grease.

Another object of the invention is to provide a nozzle having a novel arrangement of air and grease passages so that the blast of compressed air will pass through the casing of the nozzle about the filler thereof through which the liquefied grease passes and not only cause the grease to be discharged from the nozzle in a fine spray but also create a suction which will cause the grease to be sucked through the grease passage of the filler.

Another object of the invention is to so form the nozzle that it will be simple in construction and consist of parts which may be readily taken apart when it is necessary to clean the nozzle or make repairs.

This invention is illustrated in the accompanying drawing, wherein

Figure 1 is a view showing the improved nozzle in side elevation;

Fig. 2 is a longitudinal sectional view through the nozzle taken on the line 2—2 of Fig. 1, and Fig. 3 is a transverse sectional view taken on the line 3—3 of Fig. 2.

The casing 1 of the nozzle has been shown rectangular in cross section, but it will be understood that it may be cylindrical or any other shape desired. Ears 2 extend from opposite sides of the casing and are formed with openings 3 through which fasteners may be passed to secure the nozzle to a suitable support and in a vertical position. The chamber 4 which is formed in the casing extends axially thereof with its lower end opening through the bottom of the casing and its upper end opening through the concaved upper end 5 thereof. The chamber 4 is rectangular in cross section throughout its length, as shown in Fig. 3, but the upper end portion 6 of the chamber is tapered, as shown in Fig. 2.

The filler 7 which fits into the chamber 4 and is held in place therein by a head 8 screwed upon the reduced and threaded lower end portion 9 of the casing is also rectangular in cross section and intermediate its length is reduced in diameter so as to provide an annular space 10 in the casing with which the air inlet port 11 communicates. The port 11 is formed transversely of the casing, as shown in Fig. 2, and has its outer end portion enlarged and threaded so that the pipe 12 which leads from a suitable source of compressed air may be screwed into the outer end portion of the port. The upper end portion 13 of the filler which projects through the tapered upper end portion 6 of the chamber 4 and terminates at its upper end in a flared spreader head 14 is of a diameter to dispose its faces in spaced relation to the walls of the tapered upper end portion of the chamber and the portion of the filler between the reduced intermediate portion and tapered upper end portion is formed with longitudinally extending grooves 15. It will, therefore, be seen that air fed into the annular space 10 through the inlet port 11 may pass through the grooves 15 and outwardly through the tapered upper end portion of the casing in the form of a thin film of air completely surrounding the tapered upper end portion of the filler. This film of air converges outwardly and is then spread by contact with the spreader head 14 so that it leaves the head 14 in the form of a wide spray which will be well distributed over the inner surface of the pan 16 when the pan is placed in an inverted position upon suitable supporting means 16′ and moved about over the nozzle. The grease passage 17 extends axially of the filler with its upper end communicating with branches 18 which open through the tapered upper end portion of the filler and communicate with the space between the tapered upper end portion of the filler and the walls of the tapered upper end portion of the chamber 4. Therefore, the film of air discharged through the grooves 15 will pass over the outer ends of the branches 18 and create a suction in order to cause liquid grease to be drawn upwardly through the fil'er. This liquid grease mixes with the air and is discharged in the form of a spray to be applied to the pan. The passage 17 has its lower end portion enlarged and threaded to form a socket 19 which registers with an opening 20 formed in the head 8 and is adapted to receive the threaded upper end portion of a feed pipe 21. The pipe 21 is of a diameter to extend inwardly through the neck 22 of the can 23 and is formed with a collar 24 engaged by the cap nut 25. The cap nut when screwed upon the threaded neck of the grease receptacle very firmly holds the pipe in engagement with the pan and provides a tight closure so that the suction through the passage 17 and pipe 21 will cause the liquid grease to be sucked from the can. The grease will, of course, be heated while in the can so that it will be delivered from the can in a liquid state.

Having thus described the invention, I claim:

1. A spray nozzle comprising an element formed at one end with a flared spreader head and having an axially extending passage leading from its other end and terminating in branches opening through the sides of said element in spaced relation to the spreader head, and a casing disposed circumferentially about said element with the spreader head thereof spaced beyond one end of the casing, said casing being provided with an air inlet intermediate its ends, said casing being formed to direct a blast of air along said element towards the spreader head and across the outer ends of said branches to create a suction in said passage.

2. A spray nozzle comprising an element formed at one end with a flared spreader head and having an axially extending passage leading from its other end and terminating in branches opening through the sides of said element in spaced relation to the spreader head, and a casing disposed circumferentially about said element with the head of the element projecting from one end of the casing to dispose the spreader head in spaced relation to the said end of said casing, said casing provided with an air inlet intermediate its ends, the adjacent peripheral surfaces of said element and casing being formed to direct a film of air towards the spreader head across the outer ends of said branches and create a suction in said passage.

3. A spray nozzle comprising a casing provided with a pocket open at its upper end and having a side inlet port intermediate its depth and an inlet in its bottom, a filler plug in said pocket having a portion spaced from the walls thereof to form an annular compartment communicating with said side inlet, the upper portion of said filler being spaced from the walls of the pocket and projecting through the open upper end of the pocket and terminating in a spreader head, longitudinally extending passages being formed for communication between said compartment and the space about the upper end portion of said filler, and said filler being formed with a longitudinally extending bore having its lower end communicating with the inlet in the bottom of said pocket and its upper end opening into the space about the upper end portion of the filler.

4. A spray nozzle comprising a casing provided with a passage formed with a tapered upper portion and having a side port constituting an air inlet, a head at the lower end of said casing formed with an opening communicating with said passage, a plug in said passage having portions in snug contact with the walls of the passage and between said portions reduced to form an annular compartment communicating with said inlet, the upper portion of said plug being tapered and extending through the tapered portion of the passage in spaced relation to the walls thereof and terminating in a spreader head above the upper end of said casing, grooves being formed longitudinally upon said plug and communicating with said compartment and the tapered upper end portion of said passage, and said plug being formed with a longitudinally extending passage having its lower end registering with the opening in said head and at its upper end communicating with the tapered portion of the passage in said casing.

5. A spray nozzle comprising a casing having a longitudinally extending passage formed with a tapered upper end portion, a head removably connected with the lower end of said casing and having an opening communicating with said passage, a plug in said passage having portions of its surface contacting with the walls of the passage and between said portions spaced from the walls of the passage to form an annular compartment in the casing, said casing having a side port communicating with said compartment and constituting an air inlet, the upper portion of said plug being tapered and projecting through the tapered upper portion of the passage in spaced relation to the walls thereof and terminating in a spreader head above the upper end of the casing, said plug being formed with a longitudinally extending passage having its lower end registering with the opening in said head and adapted to receive a supply pipe projected therethrough and at its upper end terminating in branches communicating with the space between the tapered portion of the plug and walls of the casing passage, the plug being formed with longitudinally extending external grooves communicating with said compartment and the last-mentioned space.

6. A spray nozzle comprising a casing having an axially extending passage formed with a tapered upper end portion, the upper end face of said casing being concave, a head removably carried by the lower end of said casing and formed with an opening communicating with the lower end of said passage, and a plug fitted into said passage and held against turning therein, said plug having a tapered upper end portion extending through the tapered upper end portion of the passage in spaced relation to the walls thereof and terminating in a spreader head, the intermediate portion of said plug being reduced to form an annular space in said passage about the plug and said casing having a side port constituting an air inlet communicating with said space, the plug between its tapered end portion and reduced intermediate portion being provided with longitudinally extending grooves, and said plug having a longitudinally extending passage terminating at its lower end in an enlarged threaded socket to receive a pipe passed inwardly through the opening in said head and at its upper end terminating in branch passages leading transversely through the tapered end portion of the plug.

7. A spray nozzle comprising a casing having a concaved upper end face and formed with an axially extending passage rectangular in cross section and tapered at its upper end, said casing having a side port intermediate its depth and constituting an air inlet, a head removably secured at the lower end of said casing and having an opening communicating with said passage, a plug in said passage, said plug being rectangular in cross section and having a tapered upper end portion projecting through the end of the compartment in spaced relation to the walls of the tapered upper portion of said passage and terminating in a spreader head, the intermediate portion of the plug being reduced in diameter to provide an annular space in the casing communicating with the air inlet and the portion of the plug above the reduced portion being formed with longitudinally extending grooves communicating at their lower ends with the annular space and at their upper ends communicating with space between the tapered portions of the plug and walls of the passage, and said plug being formed with an axially extending passage having its lower end portion enlarged to form a socket to receive a supply pipe projected inwardly through the opening in said head and at its upper end terminating in branches extending transversely through the tapered upper end portion of the plug.

In testimony whereof I affix my signature.

SANDER DEBUS. [L. S.]